(No Model.)
J. W. STONE.
HAY ELEVATOR.
No. 276,498.          Patented Apr. 24, 1883.
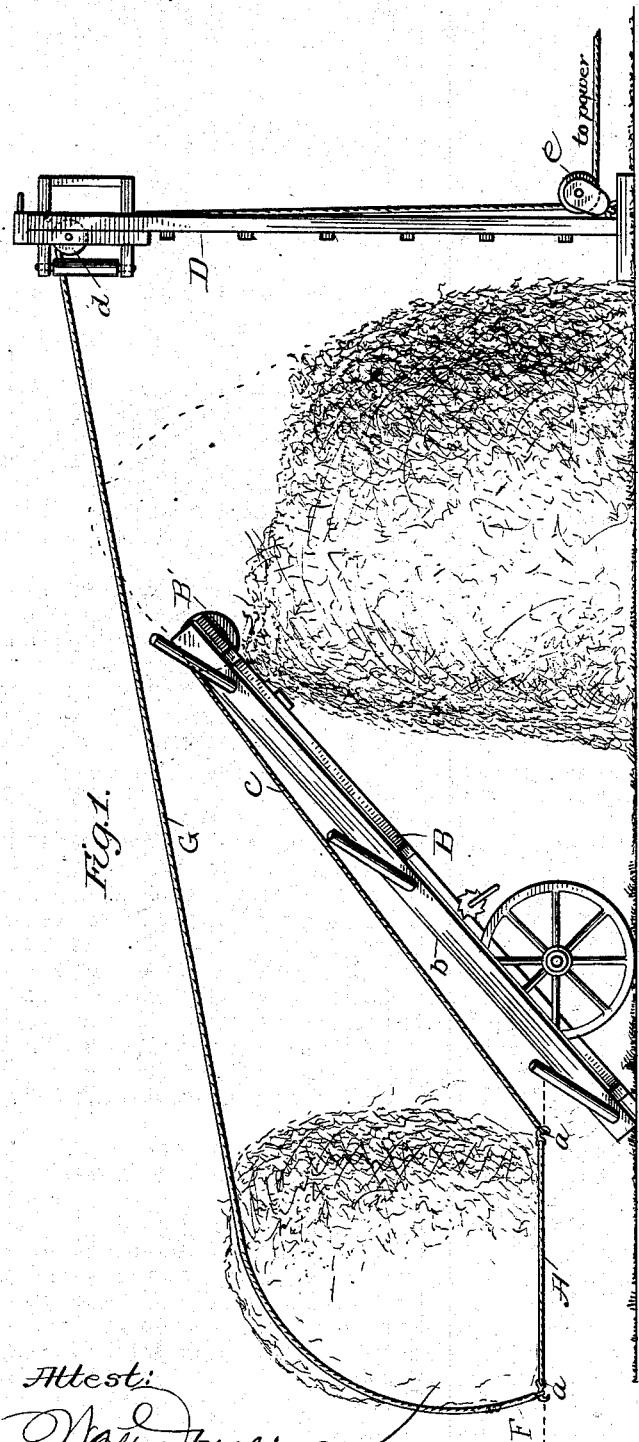
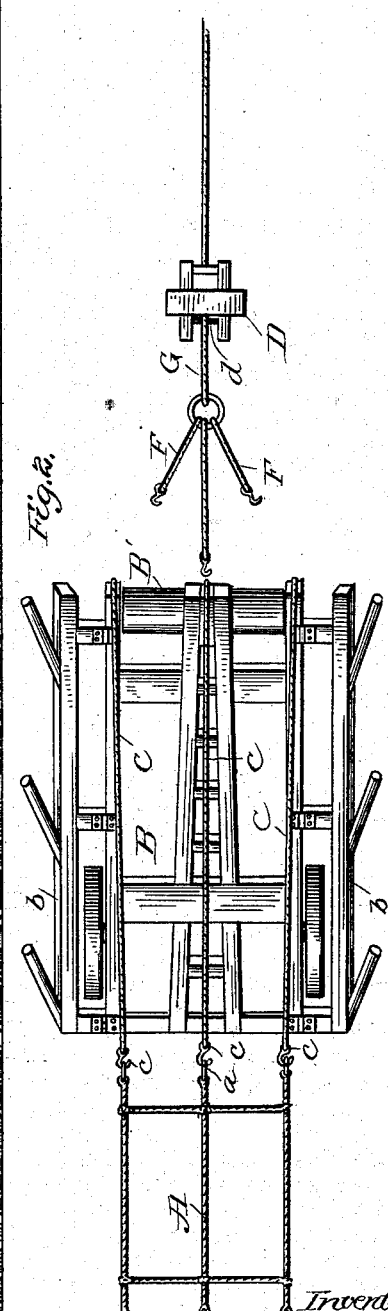
Attest:
Inventor

United States Patent Office.

JOHN W. STONE, OF INDEPENDENCE, MISSOURI.

HAY-ELEVATOR.

SPECIFICATION forming part of Letters Patent No. 276,498, dated April 24, 1883.

Application filed March 8, 1883. (No model.)

*To all whom it may concern:*

Be it known that I, JOHN W. STONE, of Independence, in the county of Jackson and State of Missouri, have invented a new and useful Improvement in Hay-Elevators; and I do hereby declare that the following is a full, clear, and exact description of the same.

My invention relates to an improvement in hay-elevators; and the object is to secure a simple and effective apparatus that will, when the proper connections are made and power applied, not only lift and deposit the hay, but will also cause the hay when being elevated to assume a compact form, rendering it easier to handle.

In the accompanying drawings, Figure 1 represents a side view of my invention, and Fig. 2 is a plan view.

In these drawings, A represents a rope platform, which is preferably made as shown, with the ends $a$ provided with hooks for connection with other parts of the device, as explained. This platform is placed on the wagon before the hay is deposited thereon.

B is an upright frame or elevator, preferably of about the height of the completed stack, adapted to form an inclined plane, up which the hay is to be rolled, in the manner hereinafter explained. This frame is provided with wheels at its lower end, on which the entire weight comes, and by reason of which the frame can be adjusted to any desired position in relation to the stack. To the sides of this frame B are hinged side pieces, $b$, by which the width of the frame B is increased when in operation. These side pieces have on their outer edges projections $b'$, which extend up at an angle of about forty-five degrees when the apparatus is in position for operation. The object of these is to widen the frame B without adding materially to its weight. It will be understood that these side pieces are turned in when not in use, making the whole more easily transported.

To the top of the frame B are attached ropes C, having at their lower ends hooks $c$, adapted, as hereinafter explained, to be joined to corresponding hooks on the rope platform.

D is a pulley-frame, smaller than B, adapted to be placed on the opposite side of the stack from B. This frame has at its top a drum, $d$, over which the operating-rope passes. At its lower end it has a block, $e$, swiveled to a cross-piece.

In the operation of the device the wagon is drawn up alongside the frame B, and the ends of ropes C are joined to corresponding ends on the inside of the rope platform, which has, as explained, been placed on the wagon before loading. To the outer side of the rope platform are attached the ropes F, which are joined to a ring at the end of the rope G. The rope G, as shown, extends from the wagon over the pulleys B' at the top of frame B, over the stack and drum $d$, down parallel to the frame D, and through the block $e$. It is provided with a single-tree at its end for the purpose of attaching a horse. When the ropes C and F have been properly connected the horse is started, and the rope platform and load are raised and rolled up the inclined plane formed by the frame B until it reaches the top of the elevator, when it falls upon the stack in a compact bundle.

Having thus described my invention, what I claim is—

1. The combination, in a hay-elevator, of an elevator, B, pulley-frame D, rope platform A, and operating devices.

2. The combination, in a hay-elevator, of the elevator B, provided with supporting-wheels, a pulley-frame, D, rope platform A, and connecting-ropes, substantially as described.

In testimony whereof I have signed my name to this specification in the presence of two subscribing witnesses.

JOHN W. STONE.

Witnesses:
 W. CHRISMAN,
 FRANK BUSH.